US012579356B2

(12) United States Patent
Gillam et al.

(10) Patent No.: US 12,579,356 B2
(45) Date of Patent: Mar. 17, 2026

(54) MATHEMATICAL CALCULATIONS WITH NUMERICAL INDICATORS

(71) Applicant: TEXAS INSTRUMENTS INCORPORATED, Dallas, TX (US)

(72) Inventors: Christopher Gillam, Jacksonville, FL (US); Todd Fortenberry, Melissa, TX (US); David Diminnie, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 22 days.

(21) Appl. No.: 17/934,644

(22) Filed: Sep. 23, 2022

(65) Prior Publication Data

US 2024/0104292 A1 Mar. 28, 2024

(51) Int. Cl.
*G06F 40/111* (2020.01)

(52) U.S. Cl.
CPC .................................. *G06F 40/111* (2020.01)

(58) Field of Classification Search
CPC .................................................... G06F 40/111
USPC .......................................................... 715/200
See application file for complete search history.

(56) References Cited

U.S. PATENT DOCUMENTS 3,593,313 A * 7/1971 Tomaszewski ......... G06F 15/00
708/130
5,067,102 A * 11/1991 Eisenstein ............. G06F 40/111
708/142

5,159,552 A * 10/1992 van Gasteren ........ G06F 40/253
704/1
5,377,130 A * 12/1994 Frank ...................... G06F 15/02
708/145
5,901,074 A * 5/1999 Nakano ............... G06F 15/0225
708/142
6,610,106 B1 * 8/2003 Jenks .................... G06F 40/111
708/142

(Continued)

OTHER PUBLICATIONS

Devitt, S. et al., "Structured Types in MathML 2.0, W3C Working Group Note," Nov. 10, 2003, W3C, 14 pages. (Year: 2003).*

(Continued)

*Primary Examiner* — Chau T Nguyen
(74) *Attorney, Agent, or Firm* — Charles F. Koch; Frank D. Cimino

(57) ABSTRACT

One example includes a method for assigning numerical indicators that each define a respective numerical format in a mathematical calculation. The method includes receiving a mathematical expression as an input. The mathematical expression includes at least one expression term. The method also includes assigning a first numerical indicator to each of the expression term(s) and performing at least one mathematical calculation provided by the mathematical expression to obtain a mathematical solution comprising at least one solution term. The method also includes assigning a second numerical indicator to each of the solution term(s) based on the first numerical indicator of each of the at least one expression term and based on rules defined in an indicator priority rule-set. The method further includes displaying each of the at least one solution term of the mathematical solution in a format corresponding to the respectively assigned second numerical indicator on a graphical display.

17 Claims, 3 Drawing Sheets

300

302 — RECEIVE A MATHEMATICAL EXPRESSION AS AN INPUT, THE MATHEMATICAL EXPRESSION COMPRISING AT LEAST ONE EXPRESSION TERM

304 — ASSIGN A FIRST NUMERICAL INDICATOR CORRESPONDING TO A NUMERICAL FORMAT TO EACH OF THE AT LEAST ONE EXPRESSION TERM

306 — PERFORM AT LEAST ONE MATHEMATICAL CALCULATION PROVIDED BY THE MATHEMATICAL EXPRESSION TO OBTAIN A MATHEMATICAL SOLUTION COMPRISING AT LEAST ONE SOLUTION TERM

308 — ASSIGN A SECOND NUMERICAL INDICATOR TO EACH OF THE AT LEAST ONE SOLUTION TERM BASED ON THE FIRST NUMERICAL INDICATOR OF EACH OF THE AT LEAST ONE EXPRESSION TERM AND BASED ON RULES DEFINED IN AN INDICATOR PRIORITY RULE-SET

310 — DISPLAY EACH OF THE AT LEAST ONE SOLUTION TERM OF THE MATHEMATICAL SOLUTION IN A FORMAT CORRESPONDING TO THE RESPECTIVELY ASSIGNED SECOND NUMERICAL INDICATOR ON A GRAPHICAL DISPLAY

(56) References Cited

U.S. PATENT DOCUMENTS

| | | | | |
|---|---|---|---|---|
| 7,742,048 | B1* | 6/2010 | Moore | G06F 40/30 |
| | | | | 715/236 |
| 9,280,524 | B2* | 3/2016 | Smirnova | G06F 40/111 |
| 10,839,570 | B2* | 11/2020 | Suzuki | G06F 7/544 |
| 11,003,839 | B1* | 5/2021 | Hatch | G06F 40/166 |
| 11,410,569 | B1* | 8/2022 | Ferreira | G09B 7/02 |
| 11,762,943 | B1* | 9/2023 | Zhang | G06F 3/04842 |
| | | | | 703/2 |
| 2004/0210869 | A1* | 10/2004 | DeVane | G06F 8/10 |
| | | | | 717/114 |
| 2006/0184915 | A1* | 8/2006 | DeGroote | G06F 40/166 |
| | | | | 717/106 |
| 2008/0091409 | A1* | 4/2008 | Anderson | G06F 8/427 |
| | | | | 704/9 |
| 2008/0120355 | A1* | 5/2008 | Alabi | G06F 40/111 |
| | | | | 715/234 |
| 2009/0019099 | A1* | 1/2009 | Kunz | G06F 40/111 |
| | | | | 708/200 |
| 2009/0157385 | A1* | 6/2009 | Tian | G06F 40/40 |
| | | | | 704/9 |
| 2009/0172070 | A1* | 7/2009 | Do | G06F 7/535 |
| | | | | 708/671 |
| 2012/0107779 | A1* | 5/2012 | Halton | G06F 40/166 |
| | | | | 434/188 |
| 2013/0024487 | A1* | 1/2013 | Yi | G06F 40/111 |
| | | | | 708/136 |
| 2013/0275122 | A1* | 10/2013 | Park | G06F 40/30 |
| | | | | 704/9 |
| 2013/0305133 | A1* | 11/2013 | Freedman | G06F 40/166 |
| | | | | 715/209 |
| 2014/0006941 | A1* | 1/2014 | Smirnova | G06F 40/111 |
| | | | | 715/268 |
| 2018/0039609 | A1* | 2/2018 | Berkland | G06F 40/174 |
| 2021/0350090 | A1* | 11/2021 | Cui | G06F 40/30 |

OTHER PUBLICATIONS

Buswell, S. et al., "The OpenMath Standard Version 2.0," (c) Jun. 2004, The OpenMath Society, 132 pages. (Year: 2004).*
Caprotti, O. et al., "A Type System for OpenMath, Version 1.0," (c) Feb. 1999, The OpenMath Consortium, 28 pages. (Year: 1999).*
Ausbrooks et al., Mathematical Markup Language (MATHML) Version 2.0 (Second Edition), W3C Recommendation Oct. 21, 2003, 541 pages. (Year: 2003).*
Miyazawa Yoshinaga, "Electronic Calculator and Calculation Display Processing Program", published on Dec. 8, 2005, Document ID JP-2005339263-A, pp. 19 (Year: 2005).*
Murai Yuji, "Electronic Computer, Computing Method, and Record Medium Storing Computing Process Program", published on Jun. 18, 1999, Document ID: JP-H11161613-A, pp. 14 (Year: 1999).*
"Simulation System, Simulation Method, and Simulation Program", published on Aug. 5, 2015, Document ID: JP 5758534 B1, pp. 11. (Year: 2015).*

* cited by examiner

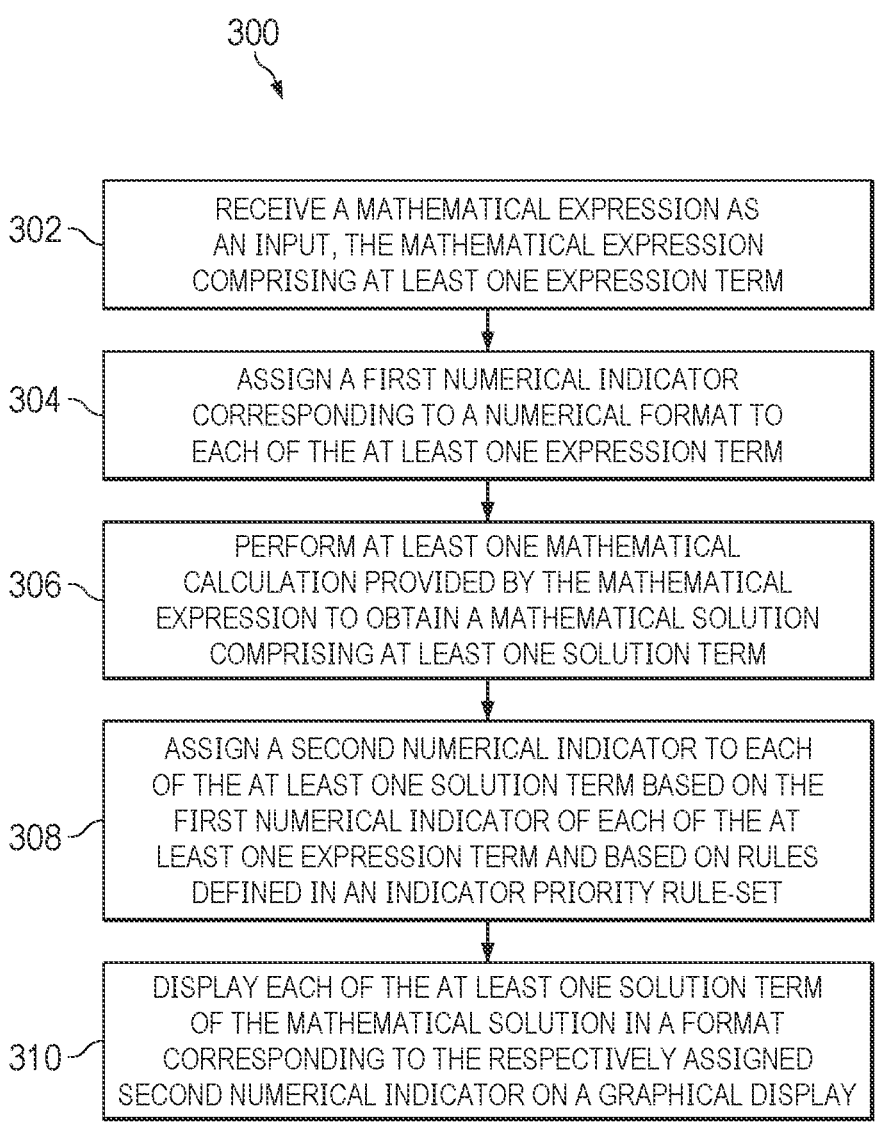

300

302 — RECEIVE A MATHEMATICAL EXPRESSION AS AN INPUT, THE MATHEMATICAL EXPRESSION COMPRISING AT LEAST ONE EXPRESSION TERM

304 — ASSIGN A FIRST NUMERICAL INDICATOR CORRESPONDING TO A NUMERICAL FORMAT TO EACH OF THE AT LEAST ONE EXPRESSION TERM

306 — PERFORM AT LEAST ONE MATHEMATICAL CALCULATION PROVIDED BY THE MATHEMATICAL EXPRESSION TO OBTAIN A MATHEMATICAL SOLUTION COMPRISING AT LEAST ONE SOLUTION TERM

308 — ASSIGN A SECOND NUMERICAL INDICATOR TO EACH OF THE AT LEAST ONE SOLUTION TERM BASED ON THE FIRST NUMERICAL INDICATOR OF EACH OF THE AT LEAST ONE EXPRESSION TERM AND BASED ON RULES DEFINED IN AN INDICATOR PRIORITY RULE-SET

310 — DISPLAY EACH OF THE AT LEAST ONE SOLUTION TERM OF THE MATHEMATICAL SOLUTION IN A FORMAT CORRESPONDING TO THE RESPECTIVELY ASSIGNED SECOND NUMERICAL INDICATOR ON A GRAPHICAL DISPLAY

FIG. 3

MATHEMATICAL CALCULATIONS WITH NUMERICAL INDICATORS

TECHNICAL FIELD

This description relates generally to software systems, and more particularly to implementing mathematical calculations with numerical indicators.

BACKGROUND

Mathematical expressions are dictated by different rules for format and display. As an example, a mathematical term that is intended to convey one-half of a quantity can be displayed as a reduced fraction "½" or "½". However, the expression "½" can be interpreted in software as the number "1" divided by the number "2", which can alternatively be expressed as "1÷2". As another example, the same quantity can be expressed as different formats of an unreduced fraction "X/2X" or "X/2X". As yet another example, the same quantity can be expressed as a decimal "0.5" or as a percentage "50%". Different formats or manners in which the mathematical term can be expressed can be preferred based on the context of the mathematical calculations or expressions. Software packages that provide mathematical calculations can be provided with default formatting that may sometimes differ from the appropriate context or preferences.

SUMMARY

One example includes a method for assigning numerical indicators that each define a respective numerical format in a mathematical calculation. The method includes receiving a mathematical expression as an input. The mathematical expression includes at least one expression term. The method also includes assigning, respectively, a first numerical indicator to each of the expression term(s) and performing at least one mathematical calculation provided by the mathematical expression to obtain a mathematical solution comprising at least one solution term. The method also includes assigning, respectively, a second numerical indicator to each of the solution term(s) based on the first numerical indicator of each of the at least one expression term and based on rules defined in an indicator priority rule-set. The method further includes displaying each of the at least one solution term of the mathematical solution in a format corresponding to the respectively assigned second numerical indicator on a graphical display.

Another example described herein includes a computer system. The system includes a graphical user interface (GUI) configured to facilitate inputs comprising a mathematical expression and to display a mathematical solution. The mathematical expression includes at least one expression term and the mathematical solution comprising at least one solution term. The system also includes a memory system configured to store an indicator priority rule-set comprising a set of rules that define a hierarchy of priority of each of different types of numerical indicators that each define a numerical format. The system further includes a mathematical calculation program configured to perform at least one mathematical calculation provided by the mathematical expression via a processor to obtain the mathematical solution. The mathematical calculation program includes a numerical indicator assigner configured to assign a first numerical indicator to each of the at least one expression term, and to assign a second numerical indicator to each of the at least one solution term based on the first numerical indicator of each of the at least one expression term and based on the indicator priority rule-set.

Another example described herein includes a computer readable medium that is configured, when executed, to implement a method for assigning numerical indicators that each define a respective numerical format in a mathematical calculation. The method includes receiving a mathematical expression as an input via a GUI. The mathematical expression includes at least one expression term. The method also includes assigning, respectively, a first numerical indicator to each of the at least one expression term and performing at least one mathematical calculation provided by the mathematical expression to obtain at least one intermediate term. The method also includes assigning, respectively, a second numerical indicator to each of the at least one intermediate term based on the first numerical indicator of each of the at least one expression term and based on an indicator priority rule-set comprising a set of rules that define a hierarchy of priority of each of different types of numerical indicators corresponding to a numerical format. The method also includes performing at least one mathematical calculation on the at least one intermediate term to obtain a mathematical solution comprising at least one solution term and assigning, respectively, a third numerical indicator to each of the at least one solution term based on the second numerical indicator of each of the at least one intermediate term and based on the indicator priority rule-set. The method further includes displaying each of the at least one solution term of the mathematical solution in a format corresponding to the respectively assigned third numerical indicator on a graphical display.

BRIEF DESCRIPTION OF THE DRAWINGS

FIG. 3 is an example of a method for assigning numerical indicators in a mathematical calculation.

DETAILED DESCRIPTION

Figure 1:
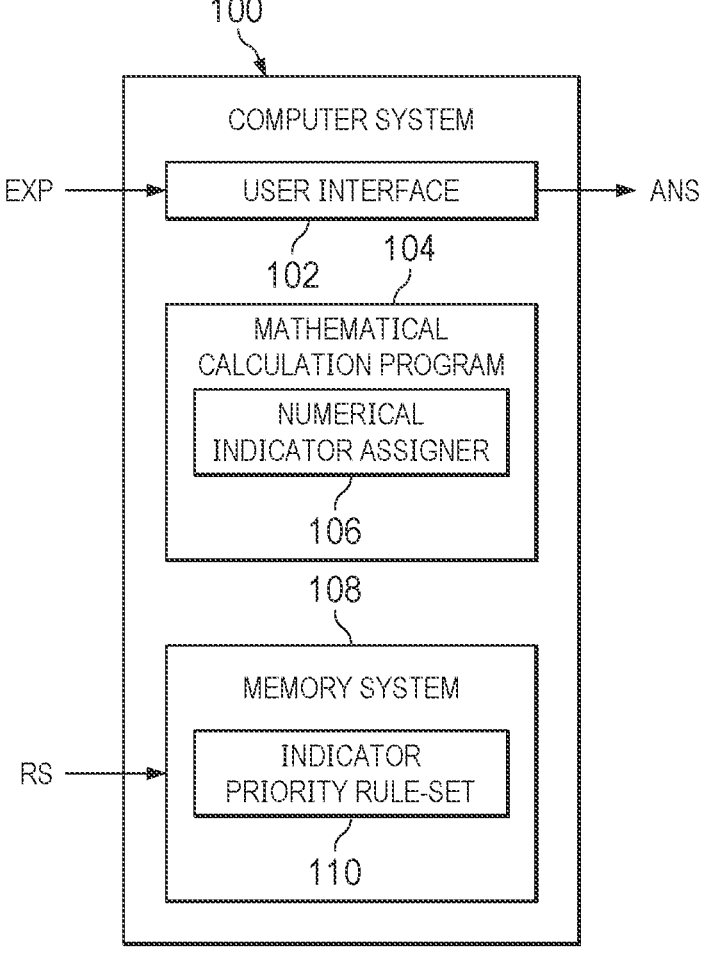
FIG. 1 is an example of a computer system.

This description relates generally to software systems, and more particularly to implementing mathematical calculations with numerical indicators. A computer system can include a user interface that is configured to facilitate inputs. As described herein, the user interface includes a graphical display screen and a manner in which a user can enter inputs, such as touchscreen inputs or physical button inputs, thereby providing a display of the entered inputs on the graphical display screen. The user interface can therefore facilitate an input of a mathematical expression that includes at least one expression term. The computer system also includes a mathematical calculation program that is configured to implement mathematical calculations via a processor.

The mathematical calculation program includes a numerical indicator assigner. The numerical indicator assigner can correspond to a software or firmware extension of the mathematical calculation program that is configured to assign numerical indicators to the terms of the mathematical expression and to every step of the mathematical calculation. As described herein, the term "numerical indicator" describes an extension of a given mathematical term that defines a numerical format, such as a display format and/or data storage format, of the mathematical term. Examples of numerical indicators include an integer indicator that defines the term as an integer, a decimal indicator that defines the term as a floating point number, and an exact indicator that defines the term as a multiplication expression and a division expression, and/or can include irrational numbers (e.g., π, e, or √2) or alpha variables. As an example, the numerical indicator can be saved in memory as a data tag along with the respective term. For example, the data tag can be a multi-bit (e.g., two-bit) data tag that describes the type of the numerical indicator.

The numerical indicator assigner can assign the numerical indicators based on rules that are defined in an indicator priority rule-set that is stored in memory. As an example, the numerical indicator assigner can access the indicator priority rule-set any time a mathematical term is entered by the user interface or created by the mathematical calculation. For example, the numerical indicator assigner can assign a numerical indicator to each of the expression terms that are entered via the user interface based on the format of the entered expression terms. As an example, the numerical indicator assigner can identify that an entered decimal expression term should be given a decimal indicator, an entered integer expression term should be given an integer indicator, or an entered irrational number expression term should be given an exact indicator. As another example, the numerical indicator assigner can assign a numerical indicator to each intermediate term of the mathematical calculation based on the rules of the indicator priority rule-set that dictate priority of different numerical indicators, beginning with the expression terms, in a given calculation. Similarly, the numerical indicator assigner can assign a numerical indicator to each solution term of the mathematical calculation based on the rules of the indicator priority rule-set that dictate priority of different numerical indicators of the different intermediate terms in a given calculation. Therefore, the rules of the indicator priority rule-set can dictate propagation of the numerical indicators from the expression terms to the solution term(s) in a given mathematical calculation. Accordingly, by implementing the numerical indicator assigner, the mathematical calculation program can provide greater consistency and/or contextually more appropriate format of solution terms in a mathematical calculation.

FIG. 1 is an example of a computer system 100. The computer system 100 can be any of a variety of computer devices that can provide computational resources for a user, such as a personal or enterprise computer, a laptop computer, a tablet device, or a calculator device. As described herein, the computer system 100 can thus implement mathematical calculations on mathematical expressions (EXP) provided as an input from a user.

The computer system 100 includes a user interface 102 that is configured to facilitate the user input. As described herein, the user interface 102 includes a graphical display screen and a manner in which a user can enter inputs. For example, the graphical display screen can be configured as a touchscreen, or the user interface 102 can further include physical buttons to facilitate the user input. The user interface 102 can thus providing a display of the entered input 101 on the graphical display screen. The user input can be provided as a mathematical expression that includes at least one expression term shown as EXP in FIG. 1. As described herein, the phrase "expression term" describes a mathematical operand that is input by the user in the mathematical expression provided by the user input.

The computer system 100 also includes a mathematical calculation program 104 that is configured to implement mathematical calculations via a processor (not shown). The mathematical calculation program 104 can therefore generate a mathematical solution to the mathematical expression EXP provided by the user input based on the terms of the mathematical expression EXP. The mathematical solution includes at least one solution term. The phrase "solution term" describes a mathematical operand that is output by the mathematical calculation program 104 as the mathematical solution to the mathematical expression EXP provided by the user input. To generate the mathematical solution, the mathematical calculation program 104 can be configured to perform intermediate calculations upon which further calculations are performed to generate the mathematical solution. Therefore, the mathematical calculation program 104 can be configured to generate intermediate terms based on calculations on the expression terms and other intermediate terms. The phrase "intermediate term" therefore describes a mathematical operand that is generated by a calculation of terms (e.g., the expression terms or other intermediate terms) provided by the mathematical calculation program 104 during the calculation of the mathematical expression prior to generating the mathematical solution.

In the example of FIG. 1, the mathematical calculation program 104 includes a numerical indicator assigner 106. The numerical indicator assigner 106 can correspond to a software or firmware extension of the mathematical calculation program 104 that is configured to assign numerical indicators to the terms of the mathematical expression EXP provided by the user input 101 and to every step of the mathematical calculation. Examples of numerical indicators include an integer indicator that defines the term as an integer or a fractional term having integers in the numerator and denominator, a decimal indicator that defines the term as a floating point number, and an exact indicator that defines the term as a multiplication expression and a division expression, such as with respect to the mathematical expression EXP that includes irrational numbers (e.g., π, e, or √2) or alpha variables. Therefore, examples of an exact indicator include "π/2", "2π", "X/2", "2X", or a variation thereof (e.g., "2X/π", etc.), where "X" is an alpha variable that is input by the user as part of the expression term EXP.

The computer system 100 further includes a memory system 108. The memory system 108 can be implemented as the different types of memory associated with the computer system 100, such as including random access memory (RAM), read only memory (ROM), and/or cache memory associated with the processor(s). As an example, the numerical indicators that are assigned by the numerical indicator assigner 106 can be saved in the memory system 108 as a data tag along with the respective terms (e.g., in cache memory). For example, the numerical indicator can be a multi-bit (e.g., two-bit) data tag that describes the type of the numerical indicator (e.g., integer, decimal, or exact).

In the example of FIG. 1, the memory system 108 is also demonstrated as storing an indicator priority rule-set 110. The indicator priority rule-set 110 can correspond to a predefined set of rules that define a hierarchy of priority of each of the different types of numerical indicators during mathematical calculations. As an example, the indicator priority rule-set 110 can be based on one or more of order of operations of the mathematical calculations, user preferences, context of the mathematical calculations, or a variety of other factors. For example, the indicator priority rule-set 110 can be static for a given mathematical calculation program 104, or can be programmable by a user, demonstrated in the example of FIG. 1 by a user-provided input RS. Therefore, the indicator priority rule-set 110 can provide for provide greater consistency and/or contextually more appropriate format of solution terms in a given mathematical calculation. While the memory system 108 is demonstrated as storing only the indicator priority rule-set 110 in the example of FIG. 1, the mathematical calculation program 104 and/or the numerical indicator assigner 106 could likewise be stored in the memory system 108, such as accessible via a processor.

The numerical indicator assigner 106 can thus assign the numerical indicators based on the rules that are defined in the indicator priority rule-set 110. As an example, the numerical indicator assigner 106 can access the indicator priority rule-set 110 any time a mathematical term is entered by the user interface 102 (e.g., the expression term(s)) or created by the respective mathematical calculation (e.g., as an intermediate term or as a solution term). For example, the numerical indicator assigner 106 can assign a numerical indicator to each of the expression terms that are entered via the user interface 102 based on the format of the entered expression terms. As an example, the numerical indicator assigner 106 can identify that an entered decimal expression term should be given a decimal indicator, an entered integer expression term should be given an integer indicator, or an entered irrational number expression term should be given an exact indicator. As another example, the numerical indicator assigner 106 can assign a numerical indicator to each intermediate term of the mathematical calculation based on the rules of the indicator priority rule-set 110 that dictate priority of different numerical indicators, beginning with the expression terms, in a given calculation. Similarly, the numerical indicator assigner 106 can assign a numerical indicator to each solution term of the mathematical calculation based on the rules of the indicator priority rule-set 110 that dictate priority of different numerical indicators of the different intermediate terms in a given calculation. Therefore, the rules of the indicator priority rule-set 110 can dictate propagation of the numerical indicators from the expression terms to the solution term(s) in a given mathematical calculation.

As described previously, the indicator priority rule-set 110 can include a predefined set of rules that define a hierarchy of priority of each of the different types of numerical indicators during mathematical calculations. Examples of such rules can include:

1. Converting a division of terms that include integer or exact numerical indicators into a fraction to maintain an integer numerical indicator on the numerator and denominator when performing a mathematical calculation with another fraction in a given mathematical calculation;
2. Dividing integer numerical indicator terms results in a decimal numerical indicator in the intermediate or solution term in the absence of a fraction in a given mathematical calculation;
3. Propagating an exact numerical indicator to the mathematical solution in a solution term when an exact numerical indicator appears in an expression term;
4. Reducing fractions that include decimal numerical indicator terms in the numerator or denominator if it can result in integer numerical indicator terms in the numerator or denominator;
5. Treating terms in lists and matrices the same or differently with respect to numerical indicators based on user-defined preferences;
6. Implementing user-defined preferences for how to prioritize other rules that are competing or mutually exclusive in application.

Accordingly, the indicator priority rule-set 110 can be programmed in a variety of ways to define the rules of assigning the numerical indicators.

Upon determination of the mathematical solution by the mathematical calculation program 104, the mathematical solution can be displayed to the user via the display screen of the user interface 102. In the example of FIG. 1, the display of the mathematical solution is ANS. The mathematical solution can thus include the solution terms displayed in the format corresponding to the respective numerical indicators assigned by the numerical indicator assigner 106. Therefore, the mathematical solution can be displayed to the user in a manner that provides greater consistency and/or is in a more contextually appropriate format based on the assignment of the solution terms as defined by the indicator priority rule-set 110. By contrast, a conventional mathematical program might provide a mathematical solution in a format that is less useful to a user based on applying default rules of formatting.

Figure 2:
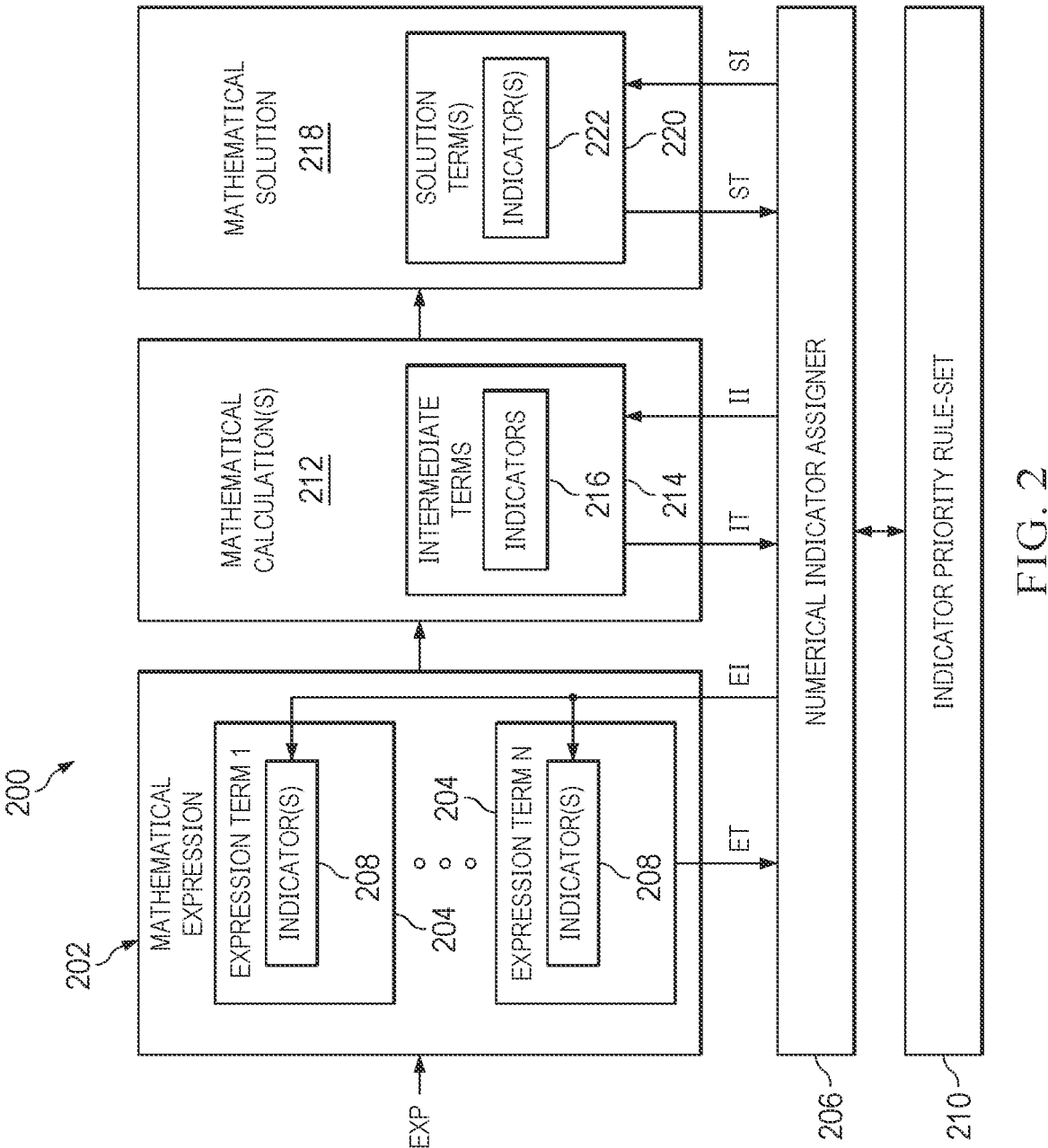
FIG. 2 is an example diagram of assigning numerical indicators.

FIG. 2 is an example diagram 200 of assigning numerical indicators. The diagram 200 demonstrates a mathematical calculation, such as performed by the mathematical calculation program 104. Therefore, reference is to be made to the example of FIG. 1 in the following description of the example of FIG. 2.

The diagram 200 includes a mathematical expression 202 that includes a plurality N of expression terms 204, where N is a positive integer greater than one. The expression terms 204 are demonstrated as being provided by the user input as EXP, along with mathematical operations, to form the mathematical expression 202. The diagram 200 also includes the numerical indicator assigner 206. In response to entry of the mathematical expression 202 via the user input, the numerical indicator assigner 206 can be programmed to identify the expression terms 204, demonstrated as a signal ET, and can assign numerical indicators 208 to each of the expression terms 204, demonstrated as a signal EI. In the example of FIG. 2, the diagram 200 includes an indicator priority rule-set 210, such as saved in memory. Thus, the numerical indicator assigner 206 can access the indicator priority rule-set 210 to determine the numerical indicators 208 to assign to the expression terms 204. As an example, the numerical indicators 208 can be assigned based on the format of the expression terms 204, as provided by the user input. For example, the numerical indicators 208 can be saved as data tags in memory (e.g., the memory system 108) linked to the respective expression terms 204.

The diagram 200 includes at least one mathematical calculation 212 that can be implemented by the mathematical calculation program 104. The mathematical calculation(s) 212 can include an initial calculation of the expression terms 204 with the associated operations to generate intermediate terms 214. The mathematical calculation(s) 212 can thus include further calculation(s) on the intermediate terms 214 to generate additional subsequent intermediate terms 214. In response to the determination of an intermediate term 214, the numerical indicator assigner 206 can be programmed to identify the intermediate term 214, demonstrated as a signal IT, and can assign a respective numerical indicator 216 to the intermediate term 214, demonstrated as a signal II. Similar to as described above, the numerical indicator assigner 206 can access the indicator priority rule-set 210 to determine the numerical indicators 216 to assign to the intermediate terms 214. As an example, the numerical indicators 216 can be assigned based on the hierarchy of priority of numerical indicators defined by the rules in the indicator priority rule-set 210.

For example, a mathematical calculation of two or more expression terms 204 or two or more intermediate terms 214 can have different numerical indicators among the terms. The indicator priority rule-set 210 can define a priority of which of the different numerical indicators should be assigned to the resultant intermediate term, such as based on order of operations, the specific numerical indicators of the terms of the calculation, or any of a variety of other (e.g., user-defined) rules for hierarchy of the numerical indicators. Therefore, the numerical indicator assigner 206 can assign the appropriate numerical indicator to the respective resultant intermediate term 214, as defined by the indicator priority rule-set 210. Similar to as described above, the numerical indicators 216 can be saved as data tags in memory (e.g., the memory system 108) linked to the respective intermediate terms 214.

The diagram 200 further includes a mathematical solution 218 that is generated by the mathematical calculation(s) 212. The mathematical solution 218 can include one or more solution terms 220 resulting from the mathematical calculation(s) 212 of the intermediate terms 214. In response to the determination of each solution term 220, the numerical indicator assigner 206 can be programmed to identify the solution term 220, demonstrated as a signal ST and can assign a respective numerical indicator 222 to the solution term 220, demonstrated as a signal SI. Similar to as described above, the numerical indicator assigner 206 can access the indicator priority rule-set 210 to determine the numerical indicators 222 to assign to the solution terms 220. As an example, the numerical indicators 222 can be assigned based on the hierarchy of priority of numerical indicators defined by the rules in the indicator priority rule-set 210.

Similar to as described above, as an example, a mathematical calculation of two or more intermediate terms 214 can have different numerical indicators among the terms. The indicator priority rule-set 210 can define a priority of which of the different numerical indicators should be assigned to the resultant solution term 220, such as based on order of operations, the specific numerical indicators of the terms of the calculation, or any of a variety of other (e.g., user-defined) rules for hierarchy of the numerical indicators. The indicator priority rule-set 210 can also dictate different priority rules for intermediate terms 214 relative to solution terms 220. Therefore, the numerical indicator assigner 206 can assign the appropriate numerical indicator to the respective resultant solution term 220, as defined by the indicator priority rule-set 210. As also described above, the numerical indicators 222 can be saved as data tags in memory (e.g., the memory system 108) linked to the respective solutions term 220. Additionally, while the example of FIG. 2 demonstrates the inclusion of intermediate terms 214, intermediate terms 214 can be omitted in simple mathematical calculations 212, such that the mathematical solution 218 can be generated based solely on the mathematical calculation(s) 212 of expression terms 204.

As a result, based on the assignment of the numerical indicators by the numerical indicator assigner 206, the mathematical solution 218 can be displayed to the user (e.g., via the user interface 102) in a format that is consistent, expected, and/or contextually appropriate for the given mathematical calculation(s) 212. Accordingly, the mathematical calculation program 104 can be programmed in a manner that is more useful to the user than simple default formatting as provided by conventional calculation programs.

In view of the foregoing structural and functional features described above, an example method will be better appreciated with reference to FIG. 3. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 3 illustrates an example of a method 300 for assigning numerical indicators (e.g., the numerical indicators 208, 216, and 222) in a mathematical calculation (e.g., the mathematical calculation(s) 212). At 302, a mathematical expression (e.g., the mathematical expression 202) is received as an input (e.g., the user input 101). The mathematical expression includes at least one expression term (e.g., the expression term 204). At 304, a first numerical indicator (e.g., the numerical indicators 208) corresponding to a numerical format is respectively assigned to each of the at least one expression term. At 306, at least one mathematical calculation is performed on the mathematical expression to obtain a mathematical solution (e.g., the mathematical solution 218) comprising at least one solution term (e.g., the solution term(s) 220). At 308, a second numerical indicator (e.g., the numerical indicator(s) 222) is respectively assigned to each of the at least one solution term based on rules defined in an indicator priority rule-set (e.g., the indicator priority rule-set 210). At 310, each of the at least one solution term of the mathematical solution is displayed in a format corresponding to the respectively assigned second numerical indicator on a graphical display (e.g., the user interface 102).

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

The techniques described herein may also be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Modifications are possible in the described embodiments, and other embodiments are possible, within the scope of the claims.

What is claimed is:

1. A non-transitory computer readable medium that is configured, when executed, to implement a method for assigning numerical indicators that each define a respective numerical format in a mathematical calculation, the method comprising:

receiving a mathematical expression as an input, the mathematical expression comprising at least one expression term;

assigning, respectively, a first numerical indicator to each of the at least one expression term; and performing at least one mathematical calculation provided by the mathematical expression to obtain a mathematical solution comprising at least one solution term;

assigning, respectively, a second numerical indicator to each of the at least one solution term based on the first numerical indicator of each of the at least one expression term and based on rules defined in an indicator priority rule-set, wherein the rules are configured to match a format of the at least one expression term with a format of the at least one solution term; and displaying each of the at least one solution term of the mathematical solution in a format corresponding to the respectively assigned second numerical indicator on a graphical display;

wherein assigning the first and second numerical indicators includes:

storing the first numerical indicator associated with each of the at least one expression term as a data tag linked with each of the at least one expression term in a memory; and storing the second numerical indicator associated with each of the at least one solution term as a data tag linked with each of the at least one solution term in the memory.

2. The medium of claim 1, wherein assigning the first numerical indicator to each of the at least one expression term comprises assigning the first numerical indicator to each of the at least one expression term based on an input format of each of the at least one expression term.

3. The medium of claim 1, wherein the indicator priority rule-set as a set of rules that define a hierarchy of priority of each of different types of numerical indicators during the at least one mathematical calculation.

4. The medium of claim 3, further comprising:

receiving the indicator priority rule-set as an input; and storing the indicator priority rule-set in a memory.

5. The medium of claim 3, wherein the hierarchy of priority of each of different types of numerical indicators is defined at least in part by order of operations of the mathematical calculation.

6. The medium of claim 1, wherein performing the at least one mathematical calculation comprises obtaining at least one intermediate term associated with the mathematical calculation, the method further comprising assigning a third numerical indicator to each of the at least one intermediate term, wherein assigning the second numerical indicator to each of the at least one solution term comprises assigning the second numerical indicator to each of the at least one solution term based on the third numerical indicator assigned to each of the at least one intermediate term and based on the rules defined in the indicator priority rule-set.

7. The medium of claim 6, wherein performing the at least one mathematical calculation comprises performing the at least one mathematical calculation on a first expression term and a second expression term to obtain a respective one of the at least one intermediate term, wherein assigning the third numerical indicator to each of the at least one intermediate term comprises assigning the first numerical indicator associated with the first expression term and the first numerical indicator associated with the second expression term to the respective one of the at least one intermediate term based on a numerical indicator priority defined by the indicator priority rule-set.

8. The medium of claim 6, wherein performing the at least one mathematical calculation comprises performing the at least one mathematical calculation on a first intermediate term and a second intermediate term to obtain a respective one of the at least one solution term, wherein assigning the second numerical indicator to each of the at least one solution term comprises assigning one of the third numerical indicator associated with the first intermediate term and the third numerical indicator associated with the second intermediate term to the respective one of the at least one solution term based on a numerical indicator priority defined by the indicator priority rule-set.

9. The medium of claim 1, wherein the rules include at least one of the following:

in response to the mathematical expression including a calculation with a first fraction, convert a division of a first term and a second term that both include integer numerical indicators into a second fraction with an integer numerical indicator on a numerator and a denominator; and in response to the mathematical expression including a decimal expression, propagating a decimal expression indicator to the at least one solution.

10. A system comprising the non-transitory computer readable medium of claim 1.

11. The system of claim 10, wherein the system includes a graphical user interface.

12. A non-transitory computer readable medium that is configured, when executed, to implement a method for assigning numerical indicators that each define a respective numerical format in a mathematical calculation, the method comprising:

receiving a mathematical expression as an input via a user interface, the mathematical expression comprising at least one expression term;

assigning, respectively, a first numerical indicator to each of the at least one expression term; and performing at least one mathematical calculation provided by the mathematical expression to obtain at least one intermediate term;

assigning, respectively, a second numerical indicator to each of the at least one intermediate term based on the first numerical indicator of each of the at least one expression term and based on an indicator priority rule-set comprising a set of rules that define a hierarchy of priority of each of different types of numerical indicators corresponding to a numerical format;

performing at least one mathematical calculation on the at least one intermediate term to obtain a mathematical solution comprising at least one solution term;

assigning, respectively, a third numerical indicator to each of the at least one solution term based on the second numerical indicator of each of the at least one intermediate term and based on the indicator priority rule-set, wherein the rules are based on user preferences, and wherein the rules are configured to match a format of the mathematical expression with a format of the mathematical solution; and displaying each of the at least one solution term of the mathematical solution in a format corresponding to the respectively assigned third numerical indicator on a graphical display.

13. The medium of claim 12, wherein assigning the first, second, and third numerical indicators comprises:

storing the first numerical indicator associated with each of the at least one expression term as a data tag linked with each of the at least one expression term in a memory;

storing the second numerical indicator associated with each of the at least one intermediate term as a data tag linked with each of the at least one intermediate term in the memory; and storing the third numerical indicator associated with each of the at least one solution term as a data tag linked with each of the at least one solution term in the memory.

14. The medium of claim 12, wherein assigning the first numerical indicator to each of the at least one expression term comprises assigning the first numerical indicator to each of the at least one expression term based on an input format of each of the at least one expression term.

15. The medium of claim 12, wherein the hierarchy of priority of each of different types of numerical indicators is defined at least in part by order of operations of the mathematical calculation.

16. A system comprising the non-transitory computer readable medium of claim 12.

17. The system of claim 16, wherein the system includes a graphical user interface.

* * * * *